3,508,629
Patented Apr. 28, 1970

3,508,629
WARNING SYSTEM FOR LUBRICATED BEARING
Lionel Haworth, London, England, assignor, by mesne assignments, to Rolls-Royce Limited, Derby, England, a British company
Filed Mar. 20, 1967, Ser. No. 624,423
Claims priority, application Great Britain, Apr. 23, 1966, 17,855/66
Int. Cl. G08b 21/00; F01m 1/20
U.S. Cl. 184—6                                    4 Claims

ABSTRACT OF THE DISCLOSURE

A warning system for a lubricated bearing which may be the shaft bearing of a gas turbine engine. Bearing failure results in displacement of a striker element fracturing a frangible portion of the lubrication system and allows lubricant to escape. The consequential lowering of the lubricant pressure is used to indicate failure of the bearing.

According to the invention, there is provided a combination of a bearing and a fluid lubrication system arranged to lubricate the bearing, the lubrication system including a member containing lubricant, wherein the member has a frangible wall portion and there are also provided a striker element which is arranged, in response to a failure of the bearing, to move and fracture the frangible wall portion and permit lubricant to escape through it, and means for sensing the resultant drop in pressure of the lubricant in the member.

The invention permits incorporation of the warning system into an engine with very little modification since it makes use of existing parts such as the bearing lubrication system and its pressure gauge.

By way of example the invention will now be described with reference to the accompanying drawings.

Figure 1:
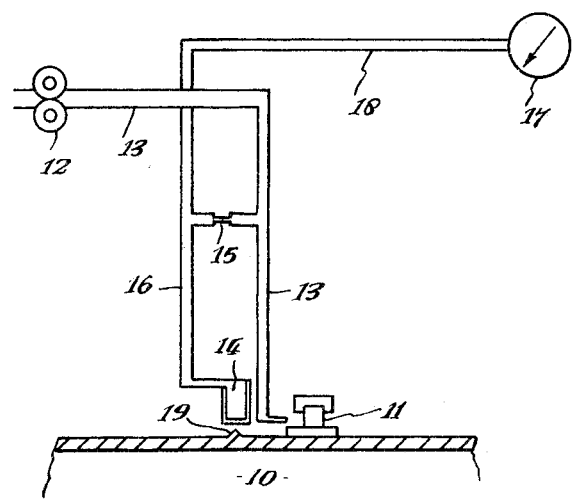
FIGURE 1 is a diagram illustrating the principle of the invention.

Referring to FIGURE 1, an engine shaft 10 is mounted on a radial bearing 11 which is arranged to be lubricated by oil supplied by a pump 12 through supply pipe 13. An oil-containing member in the form of a cell 14 is supplied with oil from pipe 13 via a flow restrictor 15 and pipe 16. The latter communicates with an oil pressure gauge 17 through pipe 18. The shaft 10 is provided externally with a number of circumferentially-spaced radial teeth 19 or other suitable puncturing means which face the radially inner end of the cell 14 but are normally spaced radially therefrom. The radially inner end wall of the cell is such as to be readily frangible.

In operation should the bearing 11 fail, the resulting wobble or radial displacement of the rotating shaft will cause the teeth 19 to puncture the opposing frangible end wall of the cell 14, thus allowing oil to escape from the cell. As a result the oil pressure in pipes 16, 18 falls and the consequential operation of the gauge 17 signals the bearing failure to an observer.

Figure 2:
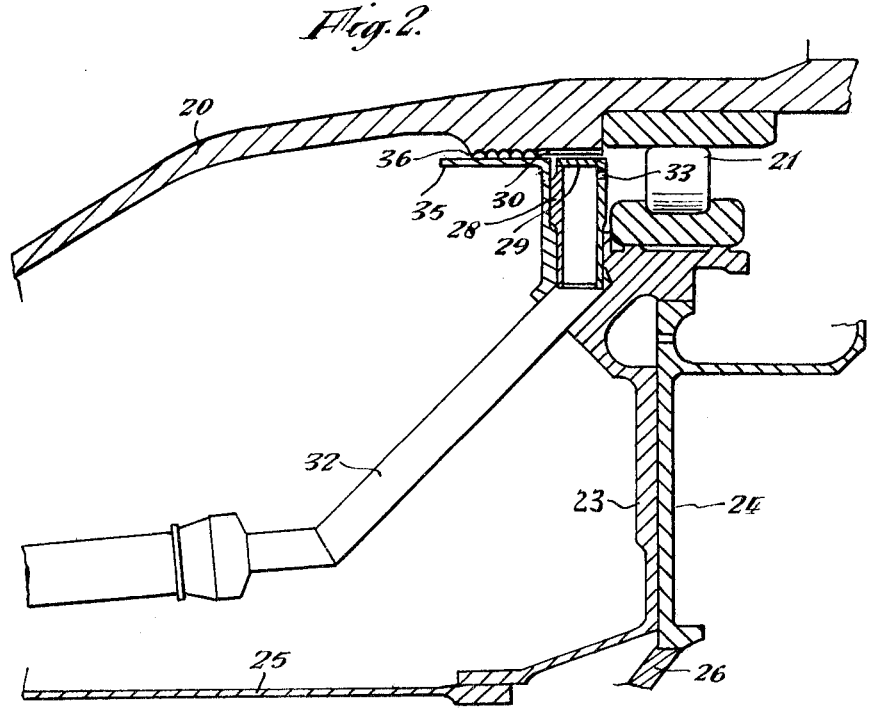
FIGURE 2 is a longitudinal section through a part of a gas turbine shaft mounted on a lubricated radial bearing.

Referring to FIGURE 2, a turbine shaft 20 is mounted on a radial roller bearing 21 adjacent the turbine (not shown) which drives the shaft. The bearing 21 is supported on the radially inner end of a flanged member 23 having a radial portion which is secured to a supporting diaphragm 24 and an axial portion which is secured to the downstream end of a tubular cooling air duct 25 which extends axially between the shaft 20 and the inner air casing (not shown) of a combustion system of the engine. The diaphragm 24 has a radially outer portion 26 of frusto-conical shape terminating in a radial flange which is bolted to a radial flange on the inner air casing. The upstream end of the inner air casing is supported in known manner from the engine casing through a ring of radial vanes located between the combustion and compressor systems of the engine.

The inner end of the flanged member 23 mounts a lubricant-containing member in the form of a radial tube 28 immediately upstream of the bearing 21. The oil tube 28 has a frangible end wall 29 opposite and normally closely spaced from a radial tooth 30 formed on the outer surface of the shaft 20. The tooth 30 which constitutes a striker element is preferably one of a ring of circumferentially-spaced teeth.

A lubrication system for the engine bearings conveys oil to the bearing 21 by a pipe line which is not illustrated. A minor flow of oil from the lubrication system after passing through a restrictor is conveyed by pipe 32 to the tube 28 the oil entering the radially outer end of the tube. In order to avoid an accumulation of deposit in the tube which might impair the effectiveness of the warning system and to avoid overheating of the oil in the tube, a small outlet 33 is formed adjacent the end wall 29 so that a small but steady flow of oil passes through the tube. The pipe 32 communicates downstream of the restrictor directly with an oil pressure sensor which normally senses the pressure of the oil in the lubrication system, including that in the tube 28.

The flanged member 23 includes an axial flange 35 which cooperates with sealing elements on the shaft 20 to form an annular seal 36 for preventing the escape of oil upstream past the member 23.

If during engine operation the bearing 21 should fail, e.g., from roller or track fatigue, the rotating shaft 20 will commence to wobble and the resulting radial displacement of the shaft will cause one or more of the teeth 30 to approach and rupture the end wall 29 of the tube 28. The oil in tube 28 will then be free to escape through the now open inner end of the tube, the oil pressure will fall and the oil pressure sensor will signal the sudden drop in oil pressure and thus the bearing failure. The warned engine operator can then take any necessary action, such as shutting down the engine. The failed bearing will also receive oil through the fractured end of the tube 28.

Figure 3:
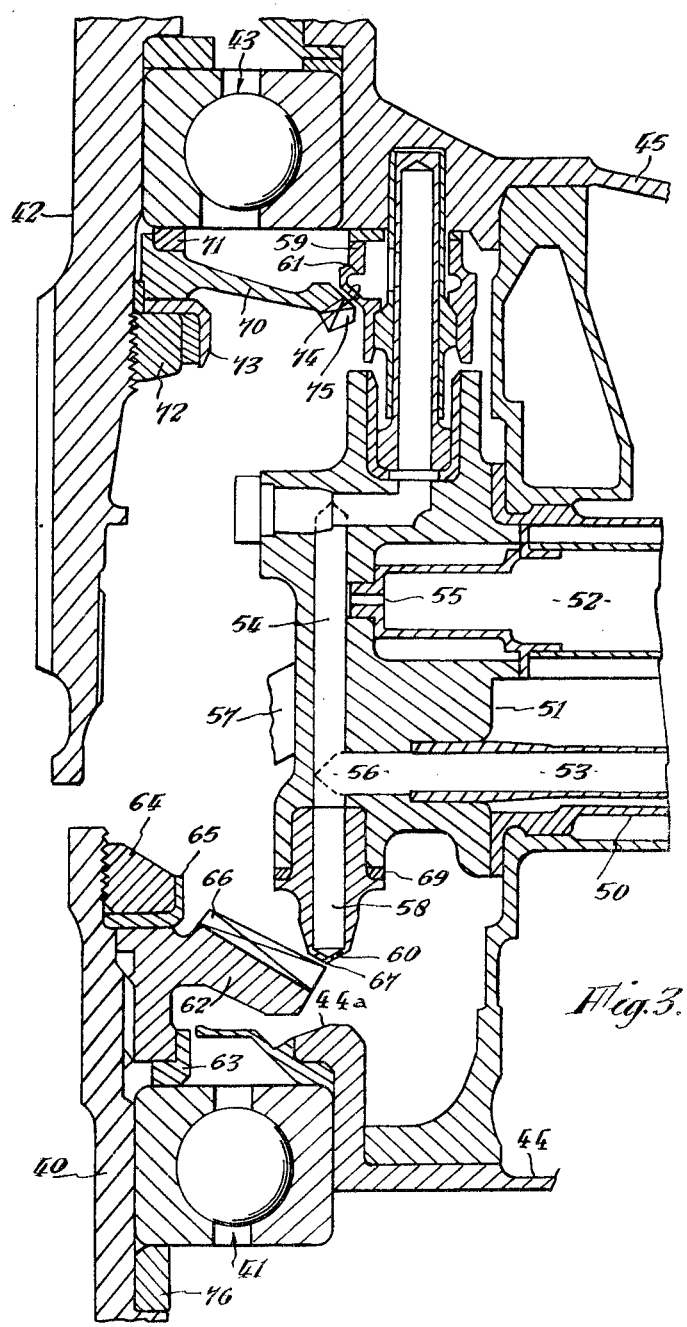
FIGURE 3 is a longitudinal section through a part of a gas turbine engine having separate shafts mounted on lubricated thrust bearings.

FIGURE 3 relates to an axial flow gas turbine engine of the two-spool kind. The upstream end of the outer or high pressure shaft 40 is mounted in an end thrust ball bearing 41 whilst the splined upstream portion 42 of an inner or low pressure shaft, which is split into two portions splined and secured together, is mounted at its downstream end in an end thrust ball bearing 43. The splined downstream portion of the low pressure shaft has been omitted for clarity. The bearing 41 is supported by a flanged diaphragm member 44 provided with a bearing-retaining lip 44a. The radially outer portion of the member 44 is connected to the inner wall of the intermediate casing (not shown) between the low and high pressure compressors in known manner, the inner wall in turn being connected to the outer wall of the intermediate casing through a ring of radial vanes. The bearing 43 is supported by a flanged diaphragm member 45 to the inner wall of the intermediate casing.

A radial hollow vane 50 in the intermediate casing mounts at its inner end a transfer block 51 which extends axially between the two axially spaced compressor bearings 41, 43. The vane 50 houses an oil supply pipe 52 forming part of a lubrication system for the engine bearings and an oil signal tube 53 which communicates with an oil pressure sensing means on the engine casing. The sensing means may take the form of a transducer which is arranged to send an electrical signal representing the oil pressure in tube 53 to a remote oil pressure gauge on an observer's panel. The block 51 is formed with a transfer passage 54 which communicates with the supply pipe 52 via a flow restrictor 55 and with the signal tube 53 via a radial passage 56. The pipe 52 communicates upstream of restrictor 55 and independently of passage 54 with pipe 57 which is shown only in part but is arranged to convey oil to the engine bearings. During normal operation the oil pressure gauge registers the oil pressure of the lubrication system. The passage 54 communicates at its ends with tubes 58, 59 which are provided with bleed oil outlets 60, 61 respectively for ensuring a small flow of oil through the passage 54 and tubes 58, 59.

Immediately upstream of bearing 41 is a bevel gear wheel 62 which is splined to the shaft 40 and clamped between an adjusting washer 63 and a clamping nut 64 provided with a locking washer 65 which is dowelled to the gearwheel 62 to prevent accidental rotation of the nut. The gearwheel is provided for driving engine fuel and oil pumps from the shaft 40. Advantage is taken of the gearwheel 62 to locate it in such a position that its teeth 66 are arranged to rotate normally close to but spaced axially and radially from an exposed frangible wall portion 67 of the oil tube 58.

The gap between the teeth 66 and the wall portion 67 may be varied by changing a shim 69 which extends between opposing shoulders on the block and tube 58. The gap may be for example about 0.020 inch. The tube 58 is of aluminium, the wall portion 67 being made thinner and therefore weaker than the remainder of the tube.

Immediately downstream of the bearing 43 is another bevel gearwheel 70 which is splined to the shaft 42 and clamped between an adjusting washer 71 and a clamping nut 72 provided with a locking washer 73. This gearwheel is provided for driving an engine speed govenor from the shaft 42. Again advantage is taken of the gearwheel 70 to locate it in such a position that its teeth are arranged to rotate adjacent a frangible wall portion 74 of the oil tube 59. Since the teeth face downstream, i.e., away from the wall portion 74, their backs are formed to provide auxiliary teeth 75 which normally rotate close to but spaced axially from the wall portion 74.

During engine operation, bearing 41 may fracture. Under the compressor thrust load which acts in the upstream sense, the fractured bearing permits the shaft 40 to move slightly upstream taking with it the gearwheel 62 which is clamped between the bearing 41 and the nut 64. Such axial displacement of the rotating gearwheel will cause its teeth 66 to approach and rupture the end wall 67 and allow oil to escape through the ruptured wall. The resulting drop in oil pressure on the downstream side of the restrictor 55 will be promptly signalled through tube 53 directly to the oil pressure sensing means which in turn will operate the pressure gauge. Although the pressure gauge will indicate the loss in oil pressure in tube 53 and passage 54 thus warning the engine observer, the lubrication systems will continue to supply oil to the various engine bearings, including the failed bearing, thus protecting the other bearings and, for example, helping the engine to windmill after the fuel supply has been cut-off by the observer.

Similarly should bearing 43 fracture, its inner tracks and also the gearwheel 70 will under the compressor thrust load transmitted through nut 72 become displaced upstream. Such axial displacement of the rotating gearwheel will cause its auxiliary teeth 75 to approach and rupture the wall portion 74 and allow oil to escape through the ruptured wall. The resulting drop in oil pressure will be promptly signalled through the tube 53 to the oil pressure sensor and the pressure gauge correspondingly operated.

Here, again the lubrication system will continue to supply oil to the bearings.

It will be noted that the invention makes use of normal components already existing in the engine such as the oil pressure gauge of the lubrication system and the gearwheels for driving engine accessories.

What I claim is:

1. The combination of a bearing and a fluid lubrication system arranged to lubricate the bearing, the lubrication system including a member for containing lubricant, said member having a frangible wall portion, and wherein a striker element is arranged to move, in response to a failure of the bearing, and to fracture the frangible wall portion so as to permit lubricant to escape through it, and means are provided for sensing the resultant drop in pressure of the lubricant in the member, characterized in that the lubricant-containing member has an inlet and a bleed outlet for ensuring, during normal operation, an uninterrupted flow of lubricant through it.

2. The combination of a bearing and a fluid lubrication system arranged to lubricate the bearing, the lubrication system including a member for containing lubricant, said member having a frangible wall portion, and wherein a striker element is arranged to move, in response to a failure of the bearing, and to fracture the frangible wall portion so as to permit lubricant to escape through it, and means are provided for sensing the resultant drop in pressure of the lubricant in the member, characterized in that the combination includes a shaft supported by the bearing and the striker element is mounted on the shaft and comprises a gearwheel.

3. The combination of a bearing and a fluid lubrication system arranged to lubricate the bearing, the lubrication system including a member for containing lubricant, said member having a frangible wall portion, a striker element associated with the bearing, the striker element being arranged to move, in response to a failure of the bearing, and to fracture the frangible wall portion so as to permit lubricant to escape through it, and means for sensing the resultant drop in pressure of the lubricant in the member, characterized in that the frangible wall portion is so positioned in relation to the bearing that, upon fracture of the frangible wall portion, lubricant is also supplied to the bearing through the fractured wall portion.

4. A gas turbine engine including a driving shaft connecting a turbine to a compressor and a combination according to claim 3, wherein the bearing is an end thrust bearing for the shaft and the striker element is mounted on the shaft between the upstream end of the bearing and the frangible wall portion, whereby failure of the bearing will result in an upstream displacement of the shaft which causes the striker element to contact and fracture the frangible wall portion, characterized in that the striker element is a ring of teeth of a bevel gearwheel which is mounted on the shaft and arranged to drive an accessory of the gas turbine engine.

References Cited

UNITED STATES PATENTS

| 2,435,343 | 2/1948 | Downey | 340—269 X |
| 2,688,428 | 9/1954 | Manhartsberger. | |
| 3,147,821 | 9/1964 | Eggenberger | 184—6 X |

FOREIGN PATENTS 1,385,892   12/1964   France.

LAVERNE D. GEIGER, Primary Examiner

E. J. EARLS, Assistant Examiner

U.S. Cl. X.R.

308—1; 340—269, 270